(12) United States Patent
Silvester

(10) Patent No.: US 7,193,993 B2
(45) Date of Patent: Mar. 20, 2007

(54) INTEGRATED MEDIUM ACCESS CONTROL DEVICE AND PHYSICAL LAYER DEVICE

(75) Inventor: Kelan C. Silvester, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1060 days.

(21) Appl. No.: 10/155,413

(22) Filed: May 23, 2002

(65) Prior Publication Data

US 2003/0219033 A1    Nov. 27, 2003

(51) Int. Cl.
*H04L 12/50* (2006.01)

(52) U.S. Cl. ...................................... 370/359; 370/338
(58) Field of Classification Search ............. 370/310.1, 370/349, 386, 389, 395.5, 401–402, 419, 370/471, 328, 254, 338, 359, 395.2, 395.3
See application file for complete search history.

(56) References Cited

U.S. PATENT DOCUMENTS

| | | | |
|---|---|---|---|
| 5,319,638 A * | 6/1994 | Lin | 370/235 |
| 5,642,421 A * | 6/1997 | Gray et al. | 713/160 |
| 6,292,492 B1 * | 9/2001 | Bonomi et al. | 370/415 |
| 6,377,549 B1 * | 4/2002 | Ngo et al. | 370/233 |
| 2002/0163902 A1 * | 11/2002 | Takao et al. | 370/338 |

* cited by examiner

*Primary Examiner*—Brenda Pham
(74) *Attorney, Agent, or Firm*—Blakely, Sokoloff, Taylor & Zafman LLP

(57) ABSTRACT

According to one embodiment, the invention provides a medium access control device. The device comprises a processor to process data packets between a data link layer and a physical layer in accordance with a communications protocol; and a physical medium independent interface coupled to the processor to send and receive data packets to and from a physical layer device, the data packets being compatible with either a wired communications medium or a wireless communications medium used by the physical layer device as a communications medium.

21 Claims, 2 Drawing Sheets

INTEGRATED MEDIUM ACCESS CONTROL DEVICE AND PHYSICAL LAYER DEVICE

FIELD OF THE INVENTION

This invention relates to data communications. In particular it relates to medium access control devices and physical layer devices.

BACKGROUND

Many networks today have a layered network architecture modeled on the Open Systems Interconnection (OSI) reference model developed by the International Standards Organization (ISO). The OSI reference model has seven protocol layers viz. an application layer, a presentation layer, a session layer, a transport layer, a network layer, a data link layer, and a physical layer.

The lowest layer is the physical layer and its function is to transfer bits over a communications medium. The next layer is the data link layer whose function is to partition input data into data frames and to sequentially transmit the frames over the physical layer. Each data frame includes a header which contains control and sequence information for the frames.

The interface between the data link layer and the physical layer includes a medium access control device, called a MAC device, and a physical layer device, called a PHY device, which controls the serial transmission of bits over the communications medium. The purpose of the MAC device and the PHY device is to ensure two network stations communicate using the correct frame formatting protocol.

In Wireless Local Area Networks (WLANs) a radio is the PHY device and free space is the physical communications medium. The Institute of Electrical and Electronic Engineers Standard IEEE 802.11 is a standard for WLAN communications and defines a communications protocol between a MAC device and a radio PHY device.

In wired Local Area Networks (LANs) the PHY device includes a port such as a Universal Serial Bus (USB) bus port and a physical cable is the physical communications medium.

Advantageously, notebook computers should support communications over a wireless medium and a wired medium. Thus, a user could take advantage of e.g. a 100 MB LAN connection when in an office or a 10 MB WLAN connection when away from the office. Due to the small form factors of notebook computers, there is a need to combine MAC and PHY devices to produce a device that supports both communications over a wireless medium and over a wire medium.

BRIEF DESCRIPTION OF THE DRAWINGS

FIG. 2 shows a flow chart of operations performed by the medium access control device of FIG. 1, in accordance with one embodiment of the invention.

DETAILED DESCRIPTION

An integrated medium access control and physical layer device is described. In the following description for purposes of explanation, numerous specific details are set forth in order to provide a thorough understanding of the invention. It will be apparent, however, to one skilled in the art that the invention can be practiced without theses specific details. In other instances, structures and devices are shown in block diagram form only, in order to avoid, obscuring the invention.

Reference in the specification to "one embodiment" or "an embodiment" means that a particular feature, structure, or characteristic described in connection with the embodiment is included in at least one embodiment of the invention. Further, the phrase "in one embodiment" in various places in the specification do not necessarily all refer to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Figure 1:
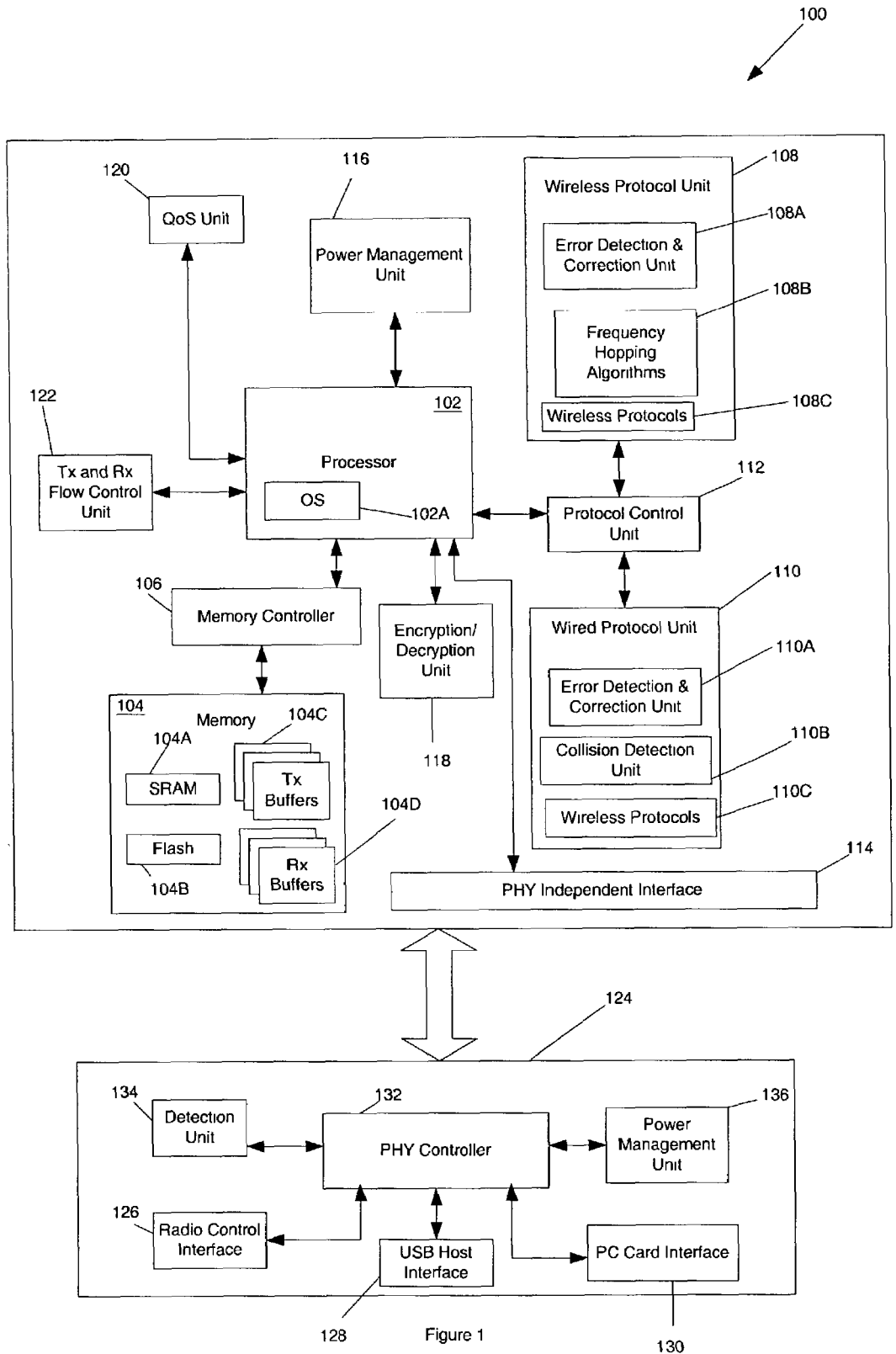
FIG. 1 shows a functional block diagram of a medium access control device in accordance with one embodiment of the invention.

FIG. 1 shows a block diagram of a medium access control device 100, in accordance with one embodiment of the invention, having an integrated PHY device.

The medium access control device 100 includes a processor 102 which processes data packets between a data link layer (not shown) and a physical layer (not shown) in accordance with a communications protocol. The communications protocol may be a wireless communications protocol such as the protocol referred to as IEEE 802.11 or a wired communications protocol such as the protocol referred to as IEEE 802.3. Running on processor 102 is an operating system 102A which in one embodiment is a Real Time Operating System (RTOS) which handles the general operating environment functions of device 100 such as memory management (allocation, de-allocation, garbage collection), timer services, interrupt handling, procedure calls, code fetch, downloads, and initial start-up and configuration of device 100.

The device 100 further includes a memory 104 which, according to one embodiment, may include a Static Random Access Memory (SRAM) device 104A, a flash memory device 104B, and a number of transmit and receive memory buffers 104C and 104D, respectively. The configuration of memory 104 is handled by a memory controller 106.

Device 100 further includes a wireless protocol unit 108 which includes modules for operating device 100 in a wireless communications mode in which device 100 formats data packets in accordance with a wireless communications protocol such as IEEE 802.11. Components of the wireless protocol unit 108 include an error detection and correction unit 108A, frequency-hopping algorithms 108B and wireless communications protocols 108C which may include the IEEE protocol 802.11.

Analogous to wireless protocol unit 108, device 100 includes a wired protocol unit 110 which contains components to run device 100 in a wired mode wherein data packets are formatted for communications in accordance with a wired protocol such as the IEEE protocol 802.3. Components of wired protocol unit 110 include an error detection and correction unit 110A, a collision detection unit 110B, and wired communications protocols 110C, which may include the IEEE wired communications protocol 802.3.

The device 100 further includes a protocol control unit 112 which controls operation of the device between its wireless communications mode and its wired communications mode. In particular, protocol control unit 112 selects which protocol unit to operate based on input from a physical layer PHY device 124 (see below).

A physical layer independent interface 114 provides the capability to send and receive data packets to and from the PHY device 124. The data is sent to the PHY device 124 in a format which is compatible with a physical medium being used by the PHY device as a communications medium, regardless of whether the physical medium is a wired medium or a wireless medium. In other words, regardless of whether device 100 is operating in its wireless communications mode or its wired communications mode, physical layer independent interface 114 provides the capability to send and receive data packets to and from the wired communications medium or wireless communications medium, as the case may be.

Device 100 further includes a power management unit 116 which is responsible for selectively turning off wireless protocol unit 108 or wired protocol unit 110 in the case of these units not being used. Data packets which are processed by processor 102 may be encrypted or decrypted by an encryption/decryption unit 118 using standard encryption/decryption algorithms. It may turn out that a remote station with which device 100 is communicating may require a different encryption/decryption algorithm to be used, for example, because of greater security needs. In this case, device 100 is able to download an appropriate encryption/decryption algorithm from, a host device (not shown) to which it is connected. The downloaded decryption/algorithm is then stored in memory 104 and used by encryption/decryption unit 118 to encrypt or decrypt communications with the remote station.

Further, the communications protocols 108C and 110C may be dynamically updated or changed during operation of device 100 as will now be described. Upon start-up, device 100 determines which communications protocols are supported by checking which protocols 108C, 110C are stored in non-volatile memory units 108, 110, respectively. In practice, device 100 may be loaded with a standard set of communications protocols viz. IEEE 802.3 for wired LAN communications, and IEEE 802.11 for wireless LAN communications define a standard set of protocols that are shipped with device 100. However, these protocols may be changed or updated depending on the needs of a user or a host device to which device 100 is connected. For example, device 100 may later be upgraded to support additional protocols such as Bluetooth. Further, bug fixes and enhancements in the existing protocols can be downloaded from the host system and stored in non-volatile memory. If a new protocol needs to be downloaded and sufficient memory does not exist for the new protocol, the device 100 may be configured to remove a seldom used protocol in order to make room for the new protocol. In this case, a handshake between the host computer and the protocol control unit 112 includes a check to ensure that the protocol being deleted is available for future download in case it is needed again. The user is able to establish a priority for communications protocols by inputting communications protocols preferences on the host computer. The device 100 may then be configured to ensure that high priority communications protocols are not deleted.

Part of the function of the protocol control unit 112 is to configure other components within device 100 depending on the needs of a particular communications protocol being used. For example, some communications protocols have different requirements for clock speeds, timers, and the amount of cache memory required to communicate optimally. The protocol unit 112 is able to dynamically configure the various components of device 100 to ensure optimum resource allocation for a particular protocol.

Device 100 further includes a quality of service (QOS) unit 120 to implement quality of service functions for each protocol. Each protocol may have different constraints to ensure quality of service for a connection with the remote status.

Device 100 further includes a transmit and receive flow control unit 122. Upon initialization of device 100, memory controller 106 allocates transmit and receive buffers of a certain size and quantity based on the requirements of the current communications protocol being used. For example, a manufacturer may determine that 50 transmit buffers and 50 receive buffers is optimal for most circumstances. During runtime, transmit and receive flow control unit 122 may determine that the existing buffer allocations is inadequate to handle existing communications. For example, a number of data packets waiting in a transmit queue (in a transmit buffer 104C) to be sent to the physical layer device 124 or the number of data packets waiting (in a receive queue in a receive buffer 104D) after having been received from the physical layer 124 may be too high based on a statistically observed norm or a predetermined threshold. In these cases, transmit and receive flow control unit 122 will send a request to memory controller 106 to dynamically alter the allocation in size and quantity of the transmit and receive buffers 104C and 104D, respectively.

Figure 2:
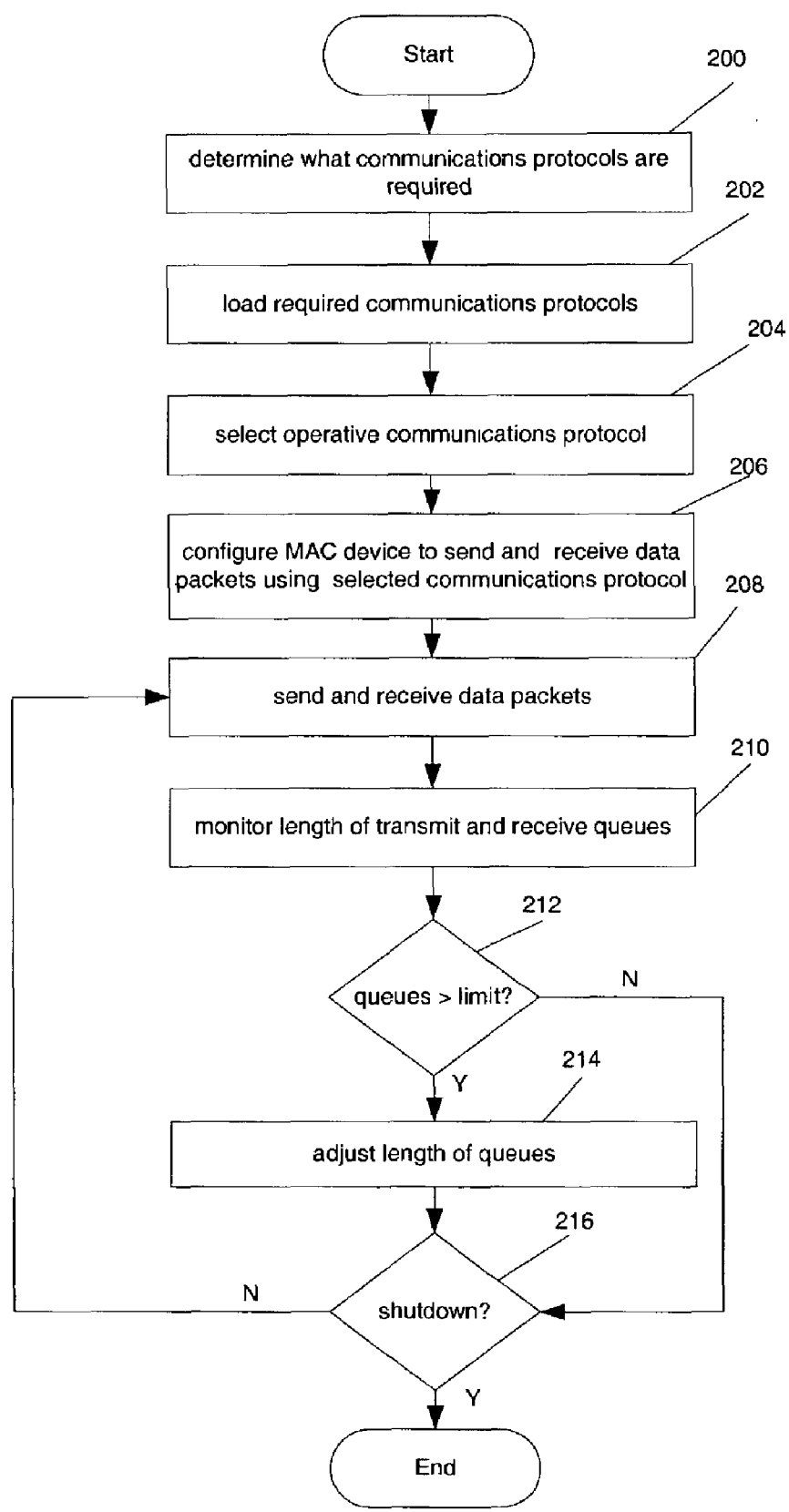
FIG. 2 shows a flow diagram of operation of a medium access control device in accordance with one embodiment of the invention.

FIG. 2 shows a flow diagram of operation of a medium access control device in accordance with one embodiment of the invention. The communications protocols required are determined, 200. The required communications protocols are loaded, 202. The operative communications protocol is selected 204. The MAC device is configured to send and receive data packets using the selected communications protocol, 206.

The data packets are sent and received, 208. The length of transmit and receive queues are monitored, 210. If the queue length is greater than the limit, 212, the queue length is adjusted, 214. If the queue length is not greater than the limit, 212, if a shutdown condition does not exist, 216, dat a packets may continue to be sent and received 208.

Device 100 includes a physical layer (PHY) device 124. The physical layer device includes a radio control interface 126 which supports communications over a wireless communications medium. A Universal Serial Bus (USB) host interface 128 and a PC card interface 130 provides communications to the remote station over a wire medium. A PHY controller 132 controls operation of the various interfaces. The PHY device 124 further includes a detection unit 134 to detect which connection types are active. For example, detection unit 134 includes logic to determine whether a wire is attached to USB host interface 128 interface or to PC card interface 130. If a wire is detected then a signal is sent to protocol unit 112 to turn on wired protocol unit 110. Detection unit 134 also probes signals received by radio control interface 126 to detect if there is a wireless connection. If a wireless connection is detected then a signal is sent to protocol control unit 112 to turn on wireless protocol unit 108. In an alternative embodiment, detection unit 134 checks a configuration table stored in memory 104 to determine what (if any) communications protocols should be loaded and/or turned on. Even though a wire may not be connected or no wireless signal may be present, certain protocols will be loaded in anticipation of such communications protocols being used. PHY device 124 further includes a power management unit 134 which turns off power to the PHY device 124 when it is not being used.

FIG. 2 of the drawings shows a method in accordance with one embodiment of the invention. Referring to FIG. 2, at 200 device 100 determines what communications protocols are required. This may be done by using detection unit 134 to determine whether there is a wireless or a wired connection as described above. Alternatively, in another embodiment of the invention, detection unit 134 reads a configuration table stored in memory 104 to determine what communications protocol should be loaded, as described above. At block 202 device 100 loads the required communications protocols into wireless protocol unit 108 and/or wired protocol unit 110. At block 204, device 100 selects one of the loaded communications protocols as an operative communications protocol. This is done based on input from detection unit 134 indicating whether to use a wired communications protocol or a wireless communications protocol. At block 206, a configuration of device 100 is altered in order to enable device 100 to send and receive data packets using the selected communications protocol. Block 206 includes changing the processor frequency, system timers, adjusting memory allocations, etc. At block 208, device 100 sends and receives data packets in accordance with the selected communications protocol. At block 210 device 100 monitors a length of transmit and receive queues holding outgoing and incoming data packets in transmit and receive buffers 104C, 104D respectively. At block 212 device 100 determines if the transmit and receive queues exceed a predetermined threshold in which case at block 214 the length of the queues is adjusted by sending a signal to memory controller 106 to dynamically adjust the size and number of transmit and receive buffers 104C and 104D respectively. If a shutdown message is detected at 216 device 100 shuts down, otherwise block 208 is re-executed.

It will be apparent from this description the aspects of the present invention may be embodied, at least partly, in software. In other embodiments, hardware circuitry may be used in combination with software instructions to implement the present invention. Thus, the techniques are not limited to any specific combination of hardware circuitry and software.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A medium access control device comprising:
   a processor to process data packets between a data link layer and a physical layer in accordance with a communications protocol;
   a memory coupled to the processor to store a wireless communications protocol and a wired communications protocol;
   a protocol control unit coupled to the processor to select a communications protocol to use;
   a physical medium independent interface coupled to the processor to send and receive data packets to and from a physical layer device, the data packets being compatible with a physical medium being used by the physical layer device as a communications medium regardless of whether the physical medium is a wired medium or a wireless medium; and
   a host interface configured to download a further communications protocol into memory in response to a communications protocol being used by the physical layer device.

2. The medium access control device of claim 1, wherein the further communications protocol is selected from the group consisting of a new protocol or an updated protocol.

3. The medium access control device of claim 1, further comprising a transmit and receive flow control unit coupled to the processor to monitor a transmit queue of data packets waiting in a transmit buffer to be sent to the physical layer device after processing, and a receive queue of data packets waiting in a receive buffer to be processed after being received from the physical layer device; and to send a request to a memory controller to dynamically readjust transmit and receive buffer parameters in response.

4. The medium access control device of claim 3, wherein the transmit and receive buffer parameters comprise a size and a number of the transmit and receive buffers respectively.

5. The medium access control device of claim 4, wherein said request comprises a request to increase the number and size of the transmit and receive buffers respectively, if the transmit and receive queues are too high in relation to a statistically observed norm.

6. The medium access control device of claim 4, wherein said request comprises a request to decrease the number and size of the transmit and receive buffers respectively, if the transmit and receive queues are too low in relation to a statistically observed norm.

7. The medium access control device of claim 6, further comprising a power management unit to turn off units of the device that are not being used.

8. The medium access control device of claim 1, further comprising an encryption and decryption unit coupled to the processor to encrypt and decrypt the data packets using encryption and decryption algorithms stored in memory, the encryption and decryption unit being configured to dynamically download via the host interface a further encryption and decryption algorithm to allow encryption and decryption of data packets in accordance with said further encryption and decryption algorithm, the downloading being in response to a received request.

9. The medium access control device of claim 1, further comprising the physical layer device which is integrated therewith.

10. The medium access control device of claim 9, wherein the physical layer device includes a wireless communications interface and a wired communications interface.

11. The medium access control device of claim 10, wherein the physical layer device includes a detection unit to detect which communications interface is to be used.

12. The medium access control device of claim 11 further comprising a power management unit to selectively turn off those communications interfaces that are not being used.

13. The medium access control device of claim 1, wherein the communications protocol is selected from the group consisting of the standards known as IEEE 802.11, and IEEE 802.3.

14. A medium access control device comprising:
   a physical medium interface to support communications with a physical layer device;

a processor to control the physical medium interface, wherein said physical medium interface and processor provide a wireless operating mode in which data is sent and received by the physical medium interface in accordance with a wireless communications protocol, and a wired operating mode in which said data is sent and received by the physical medium interface in accordance with a wired communications protocol; and a power management unit to selectively turn off components of the device that are not required for a particular operating mode;

an encryption and decryption unit to encrypt and decrypt data in accordance with an encryption and decryption algorithm, said encryption and decryption algorithm being dynamically updateable.

15. The medium access control device of claim 14, further comprising the physical layer device which is integrated therewith.

16. The medium access control device of claim 14, wherein the physical layer device includes communications interfaces to support communications according to said wired and said wireless communications protocols.

17. The medium access control device of claim 14, further comprising a detection unit to detect which interfaces and protocols are required based on a configuration of the device.

18. The medium access control device of claim 14, wherein the communications protocol used in each mode are dynamically updateable.

19. The medium access control device of claim 14, wherein a memory allocation for each mode is dynamically adjustable to optimize memory usage.

20. A medium access control device comprising:

a first means for processing data packets between a data link layer and a physical layer in accordance with a communications protocol;

a second means coupled to said first means to store a wireless communications protocol and a wired communications protocol;

a third means coupled to said first means to select a communications protocol to use; and a fourth means coupled to said first means to send and receive data packets from a physical layer device, the data packets being compatible with a physical medium being used by the physical layer device as a communications medium regardless of whether the physical medium is a wired medium or a wireless; and a fifth means to download a further communications protocol into said second means in response to a communications protocol being used by the physical layer device.

21. The medium access control device of claim 20, wherein the further communications protocol is selected from the group comprising the new protocol or an updated protocol.

* * * * *